United States Patent
Crounse et al.

(10) Patent No.: US 10,852,568 B2
(45) Date of Patent: Dec. 1, 2020

(54) ELECTRO-OPTIC DISPLAYS AND DRIVING METHODS

(71) Applicant: E Ink Corporation, Billerica, MA (US)

(72) Inventors: Kenneth R. Crounse, Somerville, MA (US); Karl Raymond Amundson, Cambridge, MA (US); Teck Ping Sim, Acton, MA (US); Yuval Ben-Dov, Cambridge, MA (US); Chih-Hsiang Ho, Andover, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 15/910,039

(22) Filed: Mar. 2, 2018

(65) Prior Publication Data

US 2018/0252980 A1    Sep. 6, 2018

Related U.S. Application Data

(60) Provisional application No. 62/466,375, filed on Mar. 3, 2017.

(51) Int. Cl.
*G09G 3/34* (2006.01)
*G02F 1/00* (2006.01)
*G02F 1/1685* (2019.01)

(52) U.S. Cl.
CPC .......... *G02F 1/0018* (2013.01); *G09G 3/344* (2013.01); *G02F 1/1685* (2019.01); *G09G 2310/063* (2013.01)

(58) Field of Classification Search
CPC ...... G02F 1/167; G02F 1/0018; G02F 1/1685; G09G 3/344; G09G 2310/063
See application file for complete search history.

(56) References Cited

U.S. PATENT DOCUMENTS

| | | |
|---|---|---|
| 4,418,346 A | 11/1983 | Batchelder |
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II |
| 5,930,026 A | 7/1999 | Jacobson |
| 6,054,071 A | 4/2000 | Mikkelsen, Jr. |
| 6,055,091 A | 4/2000 | Sheridon |
| 6,097,531 A | 8/2000 | Sheridon |
| 6,128,124 A | 10/2000 | Silverman |
| 6,130,774 A | 10/2000 | Albert |
| 6,137,467 A | 10/2000 | Sheridon |
| 6,144,361 A | 11/2000 | Gordon, II |
| 6,147,791 A | 11/2000 | Sheridon |

(Continued)

OTHER PUBLICATIONS

Korean Intellectual Property Department, PCT/US2018/020566, International Search Report and Written Opinion, dated Jun. 4, 2018. dated Jun. 4, 2018.

(Continued)

*Primary Examiner* — Robert J Michaud
(74) *Attorney, Agent, or Firm* — Zhen Bao

(57) ABSTRACT

This invention provides methods of and related apparatus for driving an electro-optic display having a plurality of pixels. The method includes dividing the plurality of pixels into n groups, where n is an integer larger than 1, applying a full clearing waveform to at least one group of the n groups of pixels, and applying a top off waveform to cardinal pixels of the at least one group of pixels.

16 Claims, 7 Drawing Sheets

(56) References Cited

U.S. PATENT DOCUMENTS

| | | |
|---|---|---|
| 6,172,798 B1 | 1/2001 | Albert |
| 6,184,856 B1 | 2/2001 | Gordon, II |
| 6,225,971 B1 | 5/2001 | Gordon, II |
| 6,241,921 B1 | 6/2001 | Jacobson |
| 6,271,823 B1 | 8/2001 | Gordon, II |
| 6,301,038 B1 | 10/2001 | Fitzmaurice |
| 6,445,489 B1 | 9/2002 | Jacobson |
| 6,504,524 B1 | 1/2003 | Gates |
| 6,512,354 B2 | 1/2003 | Jacobson |
| 6,531,997 B1 | 3/2003 | Gates |
| 6,672,921 B1 | 1/2004 | Liang |
| 6,753,999 B2 | 6/2004 | Zehner |
| 6,788,449 B2 | 9/2004 | Liang |
| 6,825,970 B2 | 11/2004 | Goenaga |
| 6,866,760 B2 | 3/2005 | Paolini, Jr. |
| 6,870,657 B1 | 3/2005 | Fitzmaurice |
| 6,900,851 B2 | 5/2005 | Morrison |
| 6,922,276 B2 | 7/2005 | Zhang |
| 6,950,220 B2 | 9/2005 | Abramson et al. |
| 6,982,178 B2 | 1/2006 | LeCain et al. |
| 6,995,550 B2 | 2/2006 | Jacobson |
| 7,002,728 B2 | 2/2006 | Pullen |
| 7,012,600 B2 | 3/2006 | Zehner |
| 7,023,420 B2 | 4/2006 | Comiskey |
| 7,034,783 B2 | 4/2006 | Gates |
| 7,075,502 B1 | 7/2006 | Drzaic |
| 7,116,318 B2 | 10/2006 | Amundson |
| 7,116,466 B2 | 10/2006 | Whitesides |
| 7,119,772 B2 | 10/2006 | Amundson |
| 7,170,670 B2 | 1/2007 | Webber |
| 7,193,625 B2 | 3/2007 | Danner |
| 7,202,847 B2 | 4/2007 | Gates |
| 7,236,291 B2 | 6/2007 | Kaga et al. |
| 7,259,744 B2 | 8/2007 | Arango |
| 7,304,787 B2 | 12/2007 | Whitesides |
| 7,312,784 B2 | 12/2007 | Baucom |
| 7,312,794 B2 | 12/2007 | Zehner |
| 7,321,459 B2 | 1/2008 | Masuda |
| 7,327,511 B2 | 2/2008 | Whitesides |
| 7,339,715 B2 | 3/2008 | Webber |
| 7,411,719 B2 | 8/2008 | Paolini, Jr. |
| 7,420,549 B2 | 9/2008 | Jacobson |
| 7,453,445 B2 | 11/2008 | Amundson |
| 7,492,339 B2 | 2/2009 | Amundson |
| 7,528,822 B2 | 5/2009 | Amundson |
| 7,535,624 B2 | 5/2009 | Amundson et al. |
| 7,545,358 B2 | 6/2009 | Gates |
| 7,583,251 B2 | 9/2009 | Arango |
| 7,602,374 B2 | 10/2009 | Zehner |
| 7,612,760 B2 | 11/2009 | Kawai |
| 7,679,599 B2 | 3/2010 | Kawai |
| 7,679,814 B2 | 3/2010 | Paolini, Jr. |
| 7,688,297 B2 | 3/2010 | Zehner |
| 7,729,039 B2 | 6/2010 | LeCain et al. |
| 7,733,311 B2 | 6/2010 | Amundson |
| 7,733,335 B2 | 6/2010 | Zehner |
| 7,787,169 B2 | 8/2010 | Abramson et al. |
| 7,839,564 B2 | 11/2010 | Whitesides et al. |
| 7,952,557 B2 | 5/2011 | Amundson |
| 7,956,841 B2 | 6/2011 | Albert |
| 7,999,787 B2 | 8/2011 | Amundson |
| 8,009,348 B2 | 8/2011 | Zehner |
| 8,077,141 B2 | 12/2011 | Duthaler |
| 8,081,155 B2 | 12/2011 | Kajino |
| 8,125,501 B2 | 2/2012 | Amundson |
| 8,139,050 B2 | 3/2012 | Jacobson |
| 8,174,490 B2 | 5/2012 | Whitesides |
| 8,289,250 B2 | 10/2012 | Zehner |
| 8,300,006 B2 | 10/2012 | Zhou |
| 8,305,341 B2 | 11/2012 | Arango |
| 8,314,784 B2 | 11/2012 | Ohkami |
| 8,319,759 B2 | 11/2012 | Jacobson |
| 8,384,658 B2 | 2/2013 | Albert |
| 8,558,783 B2 | 10/2013 | Wilcox |
| 8,558,785 B2 | 10/2013 | Zehner |
| 8,576,164 B2 | 11/2013 | Sprague |
| 8,842,139 B2 | 9/2014 | Kanamori |
| 8,928,562 B2 | 1/2015 | Gates |
| 9,230,492 B2 | 1/2016 | Harrington |
| 9,412,314 B2 | 8/2016 | Amundson |
| 9,495,918 B2 | 11/2016 | Harrington |
| 9,672,766 B2 | 6/2017 | Sjodin |
| 2003/0102858 A1 | 6/2003 | Jacobson |
| 2003/0137521 A1 | 7/2003 | Zehner |
| 2005/0253777 A1 | 11/2005 | Zehner |
| 2007/0091418 A1 | 4/2007 | Danner |
| 2007/0103427 A1 | 5/2007 | Zhou et al. |
| 2007/0109219 A1 | 5/2007 | Whitesides |
| 2007/0126693 A1 | 6/2007 | Johnson |
| 2008/0024429 A1 | 1/2008 | Zehner |
| 2008/0024482 A1 | 1/2008 | Gates |
| 2008/0136774 A1 | 6/2008 | Harris |
| 2008/0291129 A1 | 11/2008 | Harris |
| 2009/0174651 A1 | 7/2009 | Jacobson |
| 2009/0322721 A1 | 12/2009 | Zehner |
| 2010/0220121 A1 | 9/2010 | Zehner |
| 2010/0265561 A1 | 10/2010 | Gates et al. |
| 2013/0194250 A1* | 8/2013 | Amundson ............ G09G 3/344 345/212 |
| 2014/0340430 A1* | 11/2014 | Telfer ................... G09G 3/344 345/690 |
| 2015/0109358 A1 | 4/2015 | Hills et al. |
| 2016/0133196 A1 | 5/2016 | Emelie |
| 2016/0225321 A1 | 8/2016 | Sim et al. |
| 2016/0225322 A1 | 8/2016 | Sim et al. |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991). Oct. 24, 1991.

Wood, D., "An Electrochromic Renaissance?" Information Display, 18(3), 24 (Mar. 2002) Mar. 1, 2002.

Bach, U. et al., "Nanomaterials-Based Electrochromics for Paper-Quality Displays", Adv. Mater, vol. 14, No. 11, pp. 845-848 (Jun. 2002). Jun. 5, 2002.

Hayes, R.A. et al., "Video-Speed Electronic Paper Based on Electrowetting", Nature, vol. 425, No. 25, pp. 383-385 (Sep. 2003). Sep. 25, 2003.

Kitamura, T. et al., "Electrical toner movement for electronic paper-like display", Asia Display/IDW '01, pp. 1517-1520, Paper HCS1-1 (2001). Jan. 1, 2001.

Yamaguchi, Y. et al., "Toner display using insulative particles charged triboelectrically", Asia Display/IDW '01, pp. 1729-1730, Paper AMD4-4 (2001). Jan. 1, 2001.

European Patent Office, EP Appl. No. 18760499.6, Extended European Search Report, dated Feb. 7, 2020.

* cited by examiner

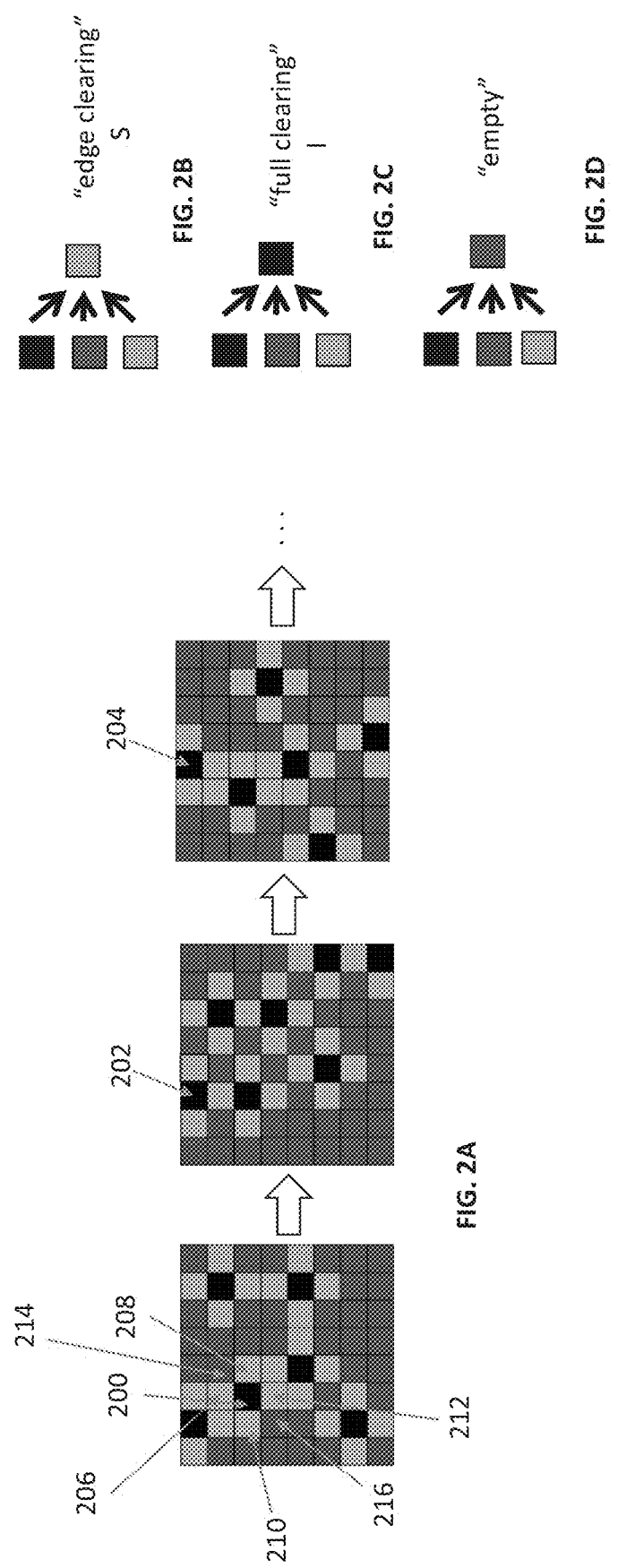

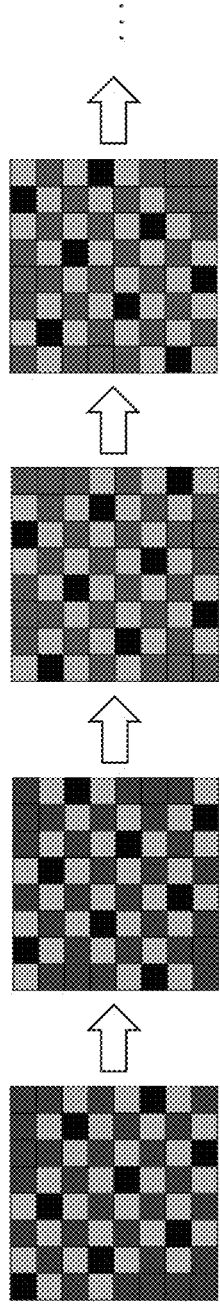

Example of imaging algorithm:

The imaging algorithm specifies:

1. locations to modify the state in the next waveform state image so that a special S-transition will be used. This transition clears edges that would be created from the previous text/images as it transitions to the black background.
2. locations to modify the state in the next waveform state image so that a special I-transition will be used. This transition clears edges that would be created from the previous all black pixels transitioning to black pixel adjacent to non-black graytones.
3. locations to modify the state in the next waveform state image so that a special T-transition will be used. This transition clears edges that would be created from the previous text/images as it transitions to the white background.
4. locations to modify the state in the next waveform state image so that a special F-transition will be used. This transition clears edges that would be created from the previous all white pixels transitioning to white pixel adjacent to non-white graytones.

```
For all pixels(i,j)in any order:
    If the pixel graytone transition is not W→W and not B→B, apply the
        standard transition.
    Else, if the pixel graytone transition is W→W, and at least SFT
        cardinal neighbors are not making a graytone transition from
        W→W, apply the F W→W transition.
    Else, if the pixel graytone transition is W→W, and all four cardinal
        neighbors have a next graytone of white, AND at least one
        cardinal neighbor has a current graytone not white, apply the T
        W->W transition.
    Else, if the pixel is selected by Active Mask(i,j), apply the I B→B
        transition.
    Else, if the pixel graytone transition is B→B, and at least SIT
        cardinal neighbors are not making a graytone transition from
        B→B, apply the I B→B transition
    Else, if all four cardinal neighbor have a next graytone of black, and
        with at least one cardinal neighbor has a current graytone not
        black, apply the S B→B transition
    Otherwise use the W→W and B→B transitions of the waveform table
End
```

FIG. 6B

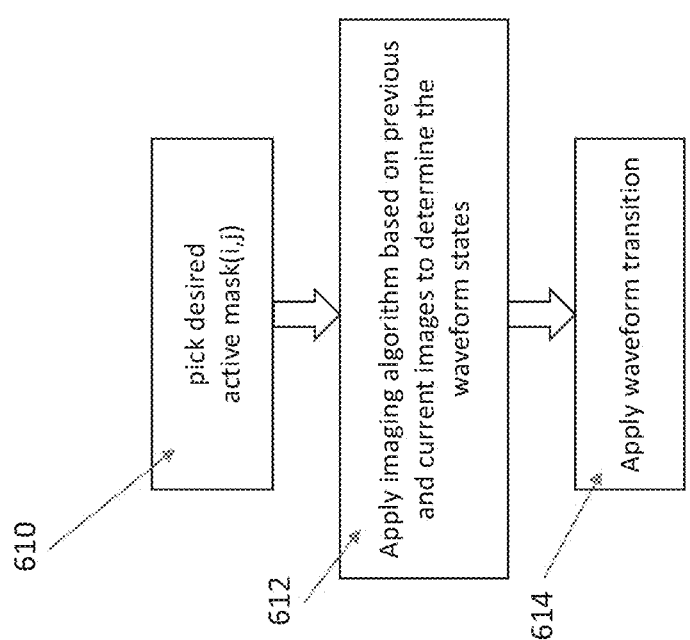

FIG. 6A

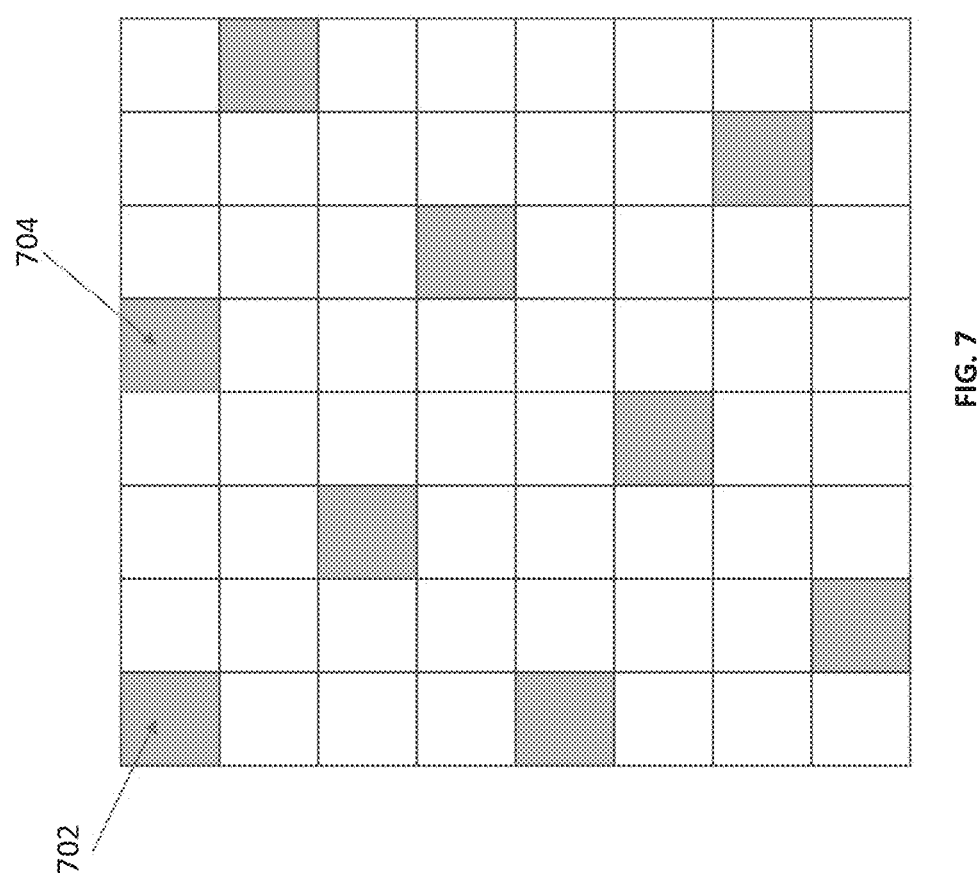

ELECTRO-OPTIC DISPLAYS AND DRIVING METHODS

REFERENCE TO RELATED APPLICATIONS

This application claims benefit of U.S. Provisional Application Ser. No. 62/466,375 filed on Mar. 3, 2017.

This application is related to U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,116,466; 7,119,772; 7,193,625; 7,202,847; 7,259,744; 7,304,787; 7,312,794; 7,327,511; 7,453,445; 7,492,339; 7,528,822; 7,545,358; 7,583,251; 7,602,374; 7,612,760; 7,679,599; 7,688,297; 7,729,039; 7,733,311; 7,733,335; 7,787,169; 7,952,557; 7,956,841; 7,999,787; 8,077,141; and 8,558,783; U.S. Patent Applications Publication Nos. 2003/0102858; 2005/0122284; 2005/0253777; 2006/0139308; 2007/0013683; 2007/0091418; 2007/0103427; 2007/0200874; 2008/0024429; 2008/0024482; 2008/0048969; 2008/0129667; 2008/0136774; 2008/0150888; 2008/0291129; 2009/0174651; 2009/0179923; 2009/0195568; 2009/0256799; 2009/0322721; 2010/0045592; 2010/0220121; 2010/0220122; 2010/0265561; 2011/0285754; 2013/0194250, 2014/0292830 and 2016/0225322; PCT Published Application No. WO 2015/017624; and U.S. patent application Ser. No. 15/014,236 filed Feb. 3, 2016.

The aforementioned patents and applications may hereinafter for convenience collectively be referred to as the "MEDEOD" (MEthods for Driving Electro-Optic Displays) applications. The entire contents of these patents and co-pending applications, and of all other U.S. patents and published and co-pending applications mentioned below, are herein incorporated by reference.

BACKGROUND

Aspects of the present disclosure relate to electro-optic displays that display in dark mode, especially bistable electro-optic displays, and to methods and apparatus for dark mode displaying. More specifically, this invention relates to driving methods in dark mode, that is, when displaying white text on a black background, which may allow for reduced ghosting, edge artifacts and flashy updates.

SUMMARY

This invention provides methods of driving an electro-optic display having a plurality of pixels to display white text on a black background ("dark mode") while reducing edge artifacts, ghosting and flashy updates. In some embodiments, this method for driving may include dividing a plurality of pixels into n groups, wherein n is an integer larger than 1, applying a full clearing waveform to at least one group of the n groups of pixels; and applying a top off waveform to cardinal pixels of the at least one group of pixels.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIG. 2A shows an electro-optic display with a plurality of display pixels going through multiple transitions.

FIG. 2B shows a display pixel going through an edge clearing transition.

FIG. 2C shows a display pixel going through a full clearing transition.

FIG. 2D shows a display pixel not being updated.

FIG. 5A is another electro-optic display with a plurality of pixels going through multiple transitions.

FIG. 5B is a pixel map illustrating a driving scheme for updating the pixels.

FIG. 5C is an exemplary algorithm for generating the pixel map illustrated in FIG. 5B.

FIG. 6A is a flow chart illustrating the updating of the electro-optic display illustrated in FIG. 1A and FIG. 1B.

FIG. 6B are driving schemes for updating the electro-optic display illustrated in FIG. 1A.

FIG. 7 shows another embodiment of a plurality of pixels going through an updating sequence.

DETAILED DESCRIPTION

Figure 1A:
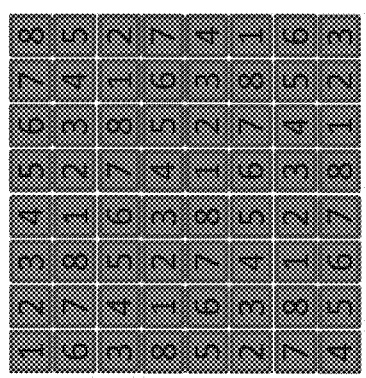
FIG. 1A shows an electro-optic display with a plurality of display pixels where each pixel is assigned a numerical value representing an updating sequence order.

The present invention relates to methods for driving electro-optic displays in dark mode, especially bistable electro-optic displays, and to apparatus for use in such methods. More specifically, this invention relates to driving methods which may allow for reduced "ghosting" and edge artifacts, and reduced flashing in such displays when displaying white text on a black background. This invention is especially, but not exclusively, intended for use with particle-based electrophoretic displays in which one or more types of electrically charged particles are present in a fluid and are moved through the fluid under the influence of an electric field to change the appearance of the display.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to above describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

Much of the discussion below will focus on methods for driving one or more pixels of an electro-optic display through a transition from an initial gray level (or "graytone") to a final gray level (which may or may not be different from the initial gray level). The terms "gray state," "gray level" and "graytone" are used interchangeably herein and include the extreme optical states as well as the intermediate gray states. The number of possible gray levels in current systems is typically 2-16 due to limitations such as discreteness of driving pulses imposed by the frame rate of the display drivers and temperature sensitivity. For example, in a black and white display having 16 gray levels, usually, gray level 1 is black and gray level 16 is white; however, the black and white gray level designations may be reversed. Herein, graytone 1 will be used to designate black. Graytone 2 will be a lighter shade of black as the graytones progress towards graytone 16 (i.e., white).

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

The term "remnant voltage" is used herein to refer to a persistent or decaying electric field that may remain in an electro-optic display after an addressing pulse (a voltage pulse used to change the optical state of the electro-optic medium) is terminated. Such remnant voltages can lead to undesirable effects on the images displayed on electro-optic displays, including, without limitation, so-called "ghosting" phenomena, in which, after the display has been rewritten, traces of the previous image are still visible. The application 2003/0137521 describes how a direct current (DC) imbalanced waveform can result in a remnant voltage being created, this remnant voltage being ascertainable by measuring the open-circuit electrochemical potential of a display pixel.

The term "waveform" will be used to denote the entire voltage against time curve used to effect the transition from one specific initial gray level to a specific final gray level. Typically such a waveform will comprise a plurality of waveform elements; where these elements are essentially rectangular (i.e., where a given element comprises application of a constant voltage for a period of time); the elements may be called "pulses" or "drive pulses". The term "drive scheme" denotes a set of waveforms sufficient to effect all possible transitions between gray levels for a specific display. A display may make use of more than one drive scheme; for example, the aforementioned U.S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible, as described in several of the aforementioned MEDEOD applications, to use more than one drive scheme simultaneously in different areas of the same display, and a set of drive schemes used in this manner may be referred to as "a set of simultaneous drive schemes."

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode themed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 7,002,728; and 7,679,814;

(b) Capsules, binders and encapsulation processes; see for example U.S. Pat. Nos. 6,922,276; and 7,411,719;

(c) Films and sub-assemblies containing electro-optic materials; see for example U.S. Pat. Nos. 6,982,178; and 7,839,564;

(d) Backplanes, adhesive layers and other auxiliary layers and methods used in displays; see for example U.S. Pat. Nos. 7,116,318; and 7,535,624;

(e) Color formation and color adjustment; see for example U.S. Pat. No. 7,075,502; and U.S. Patent Application Publication No. 007/0109219;

(f) Methods for driving displays; see the aforementioned MEDEOD applications;

(g) Applications of displays; see for example U.S. Pat. No. 7,312,784; and U.S. Patent Application Publication No. 2006/0279527; and (h) Non-electrophoretic displays, as described in U.S. Pat. Nos. 6,241,921; 6,950,220; and 7,420,549; and U.S. Patent Application Publication No. 2009/0046082.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic media may also be used in the displays of the present invention.

The bistable or multi-stable behavior of particle-based electrophoretic displays, and other electro-optic displays displaying similar behavior (such displays may hereinafter for convenience be referred to as "impulse driven displays"), is in marked contrast to that of conventional liquid crystal ("LC") displays. Twisted nematic liquid crystals are not bi- or multi-stable but act as voltage transducers, so that applying a given electric field to a pixel of such a display produces a specific gray level at the pixel, regardless of the gray level previously present at the pixel. Furthermore, LC displays are only driven in one direction (from non-transmissive or "dark" to transmissive or "light"), the reverse transition from a lighter state to a darker one being effected by reducing or eliminating the electric field. Finally, the gray level of a pixel of an LC display is not sensitive to the polarity of the electric field, only to its magnitude, and indeed for technical reasons commercial LC displays usually reverse the polarity of the driving field at frequent intervals. In contrast, bistable electro-optic displays act, to a first approximation, as impulse transducers, so that the final state of a pixel depends not only upon the electric field applied and the time for which this field is applied, but also upon the state of the pixel prior to the application of the electric field.

Whether or not the electro-optic medium used is bistable, to obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a voltage such as to ensure that all the transistors in the selected row are conductive, while there is applied to all other rows a voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed so that the next line of the display is written. This process is repeated so that the entire display is written in a row-by-row manner.

It might at first appear that the ideal method for addressing such an impulse-driven electro-optic display would be so-called "general grayscale image flow" in which a controller arranges each writing of an image so that each pixel transitions directly from its initial gray level to its final gray level. However, inevitably there is some error in writing images on an impulse-driven display. Some such errors encountered in practice include:

(a) Prior State Dependence; With at least some electro-optic media, the impulse required to switch a pixel to a new optical state depends not only on the current and desired optical state, but also on the previous optical states of the pixel.

(b) Dwell Time Dependence; With at least some electro-optic media, the impulse required to switch a pixel to a new optical state depends on the time that the pixel has spent in its various optical states. The precise nature of this dependence is not well understood, but in general, more impulse is required the longer the pixel has been in its current optical state.

(c) Temperature Dependence; The impulse required to switch a pixel to a new optical state depends heavily on temperature.

(d) Humidity Dependence; The impulse required to switch a pixel to a new optical state depends, with at least some types of electro-optic media, on the ambient humidity.

(e) Mechanical Uniformity; The impulse required to switch a pixel to a new optical state may be affected by mechanical variations in the display, for example variations in the thickness of an electro-optic medium or an associated lamination adhesive. Other types of mechanical non-uniformity may arise from inevitable variations between different manufacturing batches of medium, manufacturing tolerances and materials variations.

(f) Voltage Errors; The actual impulse applied to a pixel will inevitably differ slightly from that theoretically applied because of unavoidable slight errors in the voltages delivered by drivers.

General grayscale image flow suffers from an "accumulation of errors" phenomenon. For example, imagine that temperature dependence results in a 0.2 L* (where L* has the usual CIE definition:

$$L^* = 116(R/R0)1/3 - 16,$$

where R is the reflectance and R0 is a standard reflectance value) error in the positive direction on each transition. After fifty transitions, this error will accumulate to 10 L*. Perhaps more realistically, suppose that the average error on each transition, expressed in terms of the difference between the theoretical and the actual reflectance of the display is ±0.2 L*. After 100 successive transitions, the pixels will display an average deviation from their expected state of 2 L*; such deviations are apparent to the average observer on certain types of images.

This accumulation of errors phenomenon applies not only to errors due to temperature, but also to errors of all the types listed above. As described in the aforementioned U.S. Pat. No. 7,012,600, compensating for such errors is possible, but only to a limited degree of precision. For example, temperature errors can be compensated by using a temperature sensor and a lookup table, but the temperature sensor has a limited resolution and may read a temperature slightly different from that of the electro-optic medium. Similarly, prior state dependence can be compensated by storing the prior states and using a multi-dimensional transition matrix, but controller memory limits the number of states that can be recorded and the size of the transition matrix that can be stored, placing a limit on the precision of this type of compensation.

Thus, general grayscale image flow requires very precise control of applied impulse to give good results, and empirically it has been found that, in the present state of the technology of electro-optic displays, general grayscale image flow is infeasible in a commercial display.

The aforementioned US 2013/0194250 describes techniques for reducing flashing and edge ghosting. One such technique, denoted a "selective general update" or "SGU" method, involves driving an electro-optic display having a plurality of pixels using a first drive scheme, in which all pixels are driven at each transition, and a second drive scheme, in which pixels undergoing some transitions are not driven. The first drive scheme is applied to a non-zero minor proportion of the pixels during a first update of the display, while the second drive scheme is applied to the remaining pixels during the first update. During a second update following the first update, the first drive scheme is applied to a different non-zero minor proportion of the pixels, while the second drive scheme is applied to the remaining pixels during the second update. Typically, the SGU method is applied to refreshing the white background surrounding text or an image, so that only a minor proportion of the pixels in the white background undergo updating during any one display update, but all pixels of the background are gradually updated so that drifting of the white background to a gray color is avoided without any need for a flashy update. It will readily be apparent to those skilled in the technology of electro-optic displays that application of the SGU method requires a special waveform (hereinafter referred to as an "F" waveform or "F-Transition") for the individual pixels which are to undergo updating on each transition.

The aforementioned US 2013/0194250 also describes a "balanced pulse pair white/white transition drive scheme" or "BPPWWTDS", which involves the application of one or more balanced pulse pairs (a balanced pulse pair or "BPP" being a pair of drive pulses of opposing polarities such that the net impulse of the balanced pulse pair is substantially zero) during white-to-white transitions in pixels which can be identified as likely to give rise to edge artifacts, and are in a spatio-temporal configuration such that the balanced pulse pair(s) will be efficacious in erasing or reducing the edge artifact. Desirably, the pixels to which the BPP is applied are selected such that the BPP is masked by other update activity. Note that application of one or more BPP's does not affect the desirable DC balance of a drive scheme since each BPP inherently has zero net impulse and thus does not alter the DC balance of a drive scheme. A second such technique, denoted "white/white top-off pulse drive scheme" or "WWTOPDS", involves applying a "top-off" pulse during white-to-white transitions in pixels which can be identified as likely to give rise to edge artifacts, and are in a spatio-temporal configuration such that the top-off pulse will be efficacious in erasing or reducing the edge artifact. Application of the BPPWWTDS or WWTOPDS again requires a special waveform (hereinafter referred to as a "T" waveform or "T-Transition") for the individual pixels which are to undergo updating on each transition. The T and F waveforms are normally only applied to pixels undergoing white-to-white transitions. In a global limited drive scheme, the white-to-white waveform is empty (i.e., consists of a series of zero voltage pulses) whereas all other waveforms are not empty. Accordingly, when applicable the non-empty T and F waveforms replace the empty white-to-white waveforms in a global limited drive scheme.

Under some circumstances, it may be desirable for a single display to make use of multiple drive schemes. For example, a display capable of more than two gray levels may make use of a gray scale drive scheme ("GSDS") which can effect transitions between all possible gray levels, and a monochrome drive scheme ("MDS") which effects transitions only between two gray levels, the MDS providing quicker rewriting of the display than the GSDS. The MDS is used when all the pixels which are being changed during a rewriting of the display are effecting transitions only between the two gray levels used by the MDS. For example, the aforementioned U.S. Pat. No. 7,119,772 describes a display in the form of an electronic book or similar device capable of displaying gray scale images and also capable of displaying a monochrome dialogue box which permits a user to enter text relating to the displayed images. When the user is entering text, a rapid MDS is used for quick updating of the dialogue box, thus providing the user with rapid confirmation of the text being entered. On the other hand, when the entire gray scale image shown on the display is being changed, a slower GSDS is used.

Alternatively, a display may make use of a GSDS simultaneously with a "direct update" drive scheme ("DUDS"). The DUDS may have two or more than two gray levels, typically fewer than the GSDS, but the most important characteristic of a DUDS is that transitions are handled by a simple unidirectional drive from the initial gray level to the final gray level, as opposed to the "indirect" transitions often used in a GSDS, where in at least some transitions the pixel is driven from an initial gray level to one extreme optical state, then in the reverse direction to a final gray level; in some cases, the transition may be effected by driving from the initial gray level to one extreme optical state, thence to the opposed extreme optical state, and only then to the final extreme optical state—see, for example, the drive scheme illustrated in FIGS. 11A and 11B of the aforementioned U.S. Pat. No. 7,012,600. Thus, present electrophoretic displays may have an update time in grayscale mode of about two to three times the length of a saturation pulse (where "the length of a saturation pulse" is defined as the time period, at a specific voltage, that suffices to drive a pixel of a display from one extreme optical state to the other), or approximately 700-900 milliseconds, whereas a DUDS has a maximum update time equal to the length of the saturation pulse, or about 200-300 milliseconds.

Variation in drive schemes is, however, not confined to differences in the number of gray levels used. For example, drive schemes may be divided into global drive schemes, where a drive voltage is applied to every pixel in the region to which the global update drive scheme (more accurately referred to as a "global complete" or "GC" drive scheme) is being applied (which may be the whole display or some defined portion thereof) and partial update drive schemes, where a drive voltage is applied only to pixels that are undergoing a non-zero transition (i.e., a transition in which the initial and final gray levels differ from each other), but no drive voltage or zero voltage is applied during zero transitions or null transitions (in which the initial and final gray levels are the same). As used herein, the terms "zero transition" and "null transition" are used interchangeably. An intermediate form of drive scheme (designated a "global limited" or "GL" drive scheme) is similar to a GC drive scheme except that no drive voltage is applied to a pixel which is undergoing a zero, white-to-white transition. In, for example, a display used as an electronic book reader, displaying black text on a white background, there are numerous white pixels, especially in the margins and between lines of text which remain unchanged from one page of text to the next; hence, not rewriting these white pixels substantially reduces the apparent "flashiness" of the display rewriting.

However, certain problems remain in this type of GL drive scheme. Firstly, as discussed in detail in some of the aforementioned MEDEOD applications, bistable electro-optic media are typically not completely bistable, and pixels placed in one extreme optical state gradually drift, over a period of minutes to hours, towards an intermediate gray level. In particular, pixels driven white slowly drift towards a light gray color. Hence, if in a GL drive scheme a white pixel is allowed to remain undriven through a number of page turns, during which other white pixels (for example, those forming parts of the text characters) are driven, the freshly updated white pixels will be slightly lighter than the undriven white pixels, and eventually the difference will become apparent even to an untrained user.

Secondly, when an undriven pixel lies adjacent a pixel which is being updated, a phenomenon known as "blooming" occurs, in which the driving of the driven pixel causes a change in optical state over an area slightly larger than that of the driven pixel, and this area intrudes into the area of adjacent pixels. Such blooming manifests itself as edge effects along the edges where the undriven pixels lie adjacent driven pixels. Similar edge effects occur when using regional updates (where only a particular region of the display is updated, for example to show an image), except that with regional updates the edge effects occur at the boundary of the region being updated. Over time, such edge effects become visually distracting and must be cleared. Hitherto, such edge effects (and the effects of color drift in undriven white pixels) have typically been removed by using a single GC update at intervals. Unfortunately, use of such an occasional GC update reintroduces the problem of a "flashy" update, and indeed the flashiness of the update may be heightened by the fact that the flashy update only occurs at long intervals.

Some of the aspects of the present invention relates to reducing or eliminating the problems discussed above while still avoiding so far as possible flashy updates. However, there is an additional complication in attempting to solve the aforementioned problems, namely the need for overall DC balance. As discussed in many of the aforementioned MEDEOD applications, the electro-optic properties and the working lifetime of displays may be adversely affected if the drive schemes used are not substantially DC balanced (i.e., if the algebraic sum of the impulses applied to a pixel during any series of transitions beginning and ending at the same gray level is not close to zero). See especially the aforementioned U.S. Pat. No. 7,453,445, which discusses the problems of DC balancing in so-called "heterogeneous loops" involving transitions carried out using more than one drive scheme. A DC balanced drive scheme ensures that the total net impulse bias at any given time is bounded (for a finite number of gray states). In a DC balanced drive scheme, each optical state of the display is assigned an impulse potential (IP) and the individual transitions between optical states are defined such that the net impulse of the transition is equal to the difference in impulse potential between the initial and final states of the transition. In a DC balanced drive scheme, any round trip net impulse is required to be substantially zero.

In one aspect, this invention provides methods of driving an electro-optic display having a plurality of pixels to display white text on a black background ("dark mode" also referred to herein as "black mode") while reducing edge artifacts, ghosting and flashy updates. In addition, the white text may include pixels having intermediate gray levels, if the text is anti-aliased. Displaying black text on a light or white background is referred to herein as "light mode" or "white mode". Typically, when displaying white text on a black background, white edges or edge artifacts may accumulate after multiple updates (as with dark edges in the light mode). This edge accumulation is particularly visible when the background pixels (i.e., pixels in the margins and in the leading between lines of text) do not flash during updates (i.e., the background pixels, which remain in the black extreme optical state through repeated updates, undergo repeated black-to-black zero transitions, during which no drive voltages are applied to the pixels, and they do not flash). A dark mode where no drive voltages are applied during black-to-black transitions may be referred to as a "dark GL mode"; this is essentially the inverse of a light GL mode where no drive voltages are applied to the background pixels undergoing white-to-white zero transitions. The dark GL mode may be implemented by simply defining a zero transition for black-to-black pixels, but also, may be implemented by some other means such as a partial update by the controller.

In some embodiments, to maintain a consistent black background in the above mentioned "dark-mode", and to update the pixels in a display to maintain a consistent gray tone appearance, and yet to avoid the display being too flashy during the update, one may choose to program the display in such a fashion that the pixels are grouped into multiple groups and the pixels are updated one group at a time. In another word, a sub-population of the pixels are updated with a waveform at any given time, and each pixel is visited or updated over a certain number of updates, thereby clearing the display of edges and other artifacts (e.g., graytone drifts) over time. This configuration allows for a complete update or reset of the display pixels while maintain a relatively pleasant appearance (e.g., avoid being overly flashy) to a user.

Figure 1B:
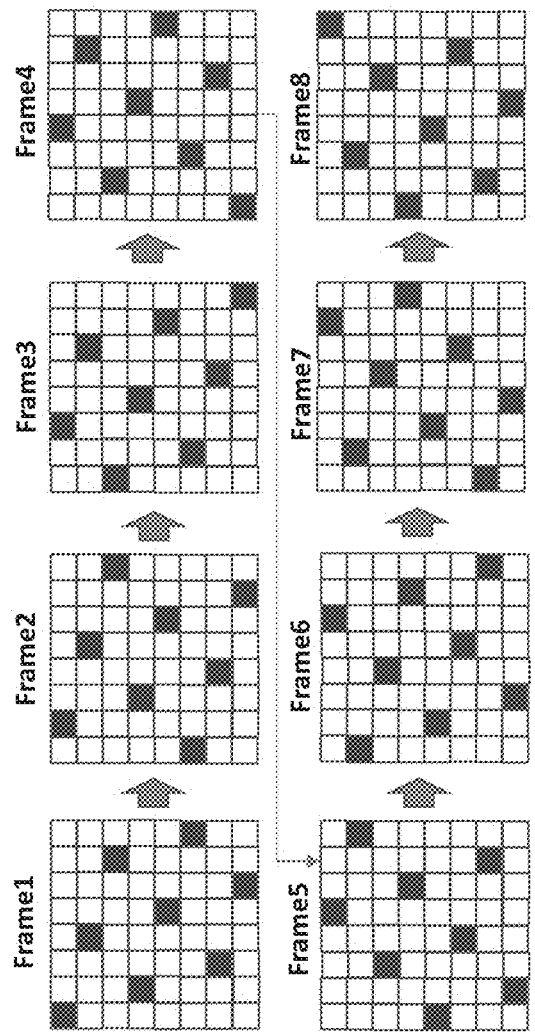
FIG. 1B shows the display illustrated in FIG. 1A going through multiple transitions as configured.

FIG. 1A illustrates an exemplary setup where several sub-populations of background pixels are updated or reset on a rotating per-update basis. The decision as to which sub-population of pixel may be updated or reset at any given time may be pre-determined systematically using a tessellating pattern, or, statistically, with an appropriate proposition of pixels being selected randomly at each update. Shown in FIG. 1A and FIG. 1B are a dithering mask and the updated sub-population of background pixels in each frames. This configuration can effectively reduce image graytone drifting, since all background pixels are update for some, every fixed number of panel updates, while only producing a mild flash, or dip, in background dark state during updates. Using a dithering mask as shown in FIG. 1A as an example, where every pixel is assigned a numerical value n (e.g., 1-8), and all background pixels will be updated once every n (e.g., n=8) frames. In another word, the plurality of display pixels within a display can be divided in to n groups, where n is a numerical value larger than 1, and the n groups of pixels may be updated one group at a time, until all the pixels have been updated or reset. The sequence of which group of pixels to be updated may be pre-determined by, for example, a computer algorithm. In the example presented in FIG. 1A, the pixel groups may be updated according to the numerical order 1-8, but it should be appreciated that any other update order or sequence may be applied according to application needs. In some embodiment, all groups of pixels may be updated, in some other embodiments, certain groups of the pixels may be updated. It should be appreciated that the size of a dithering mask could affect image graytone drifts, update flashness, localized fatigue and/or remnant voltage. For example, making the mask size large will have less updated pixels per frame which can result in a larger image graytone drift while less flashy update, localized fatigue and remnant voltage.

Furthermore, the nature of ink dictates that a DC-imbalanced waveform may be required to reset or update the background pixels, the details of the DC-imbalanced waveforms to be discussed in more detail below in FIG. 3 and FIG. 4. A such DC-imbalanced waveform may be a full clearing waveform (e.g., an iFull Pulse) or a top-off pulse (e.g., an iTop Pulse). In some embodiments, a full clearing waveform may produce a better cleaning or resetting result.

However, when a full clearing waveform is applied, such waveform may produce its own edge artifacts around an updated pixel which can persist until those pixels are themselves updated. As such, it may be necessary to perform edge clearing on these updated pixels.

FIG. 2A illustrates a plurality of display pixels going through an updating/resetting then edge clearing transition or sequence as described above. As shown, some of the pixels (e.g., pixels 200, 202, 204) may go through full clearing transition (e.g., an iFull pulse is applied of the state I, as illustrated in FIG. 2C); and such pixels may generate some edge artifacts, and as a result, its cardinal pixels (e.g., pixels 206, 208, 210 and 212 are cardinal pixels to pixel 200) will be applied an "edge clearing" transition (i.e., an iTop pulse or state S, as illustrated in FIG. 1B). This process can be applied to all the pixels within the selected group and their cardinal pixels to ensure all the pixels are free of optical artifacts, as well as to produce a uniform graytone throughout the display. Otherwise, the other pixels (e.g., pixels 214, 216) may stay idle (i.e., going through a null transition), as illustrated in FIG. 2D, they remain in an "empty" state.

Figure 3:
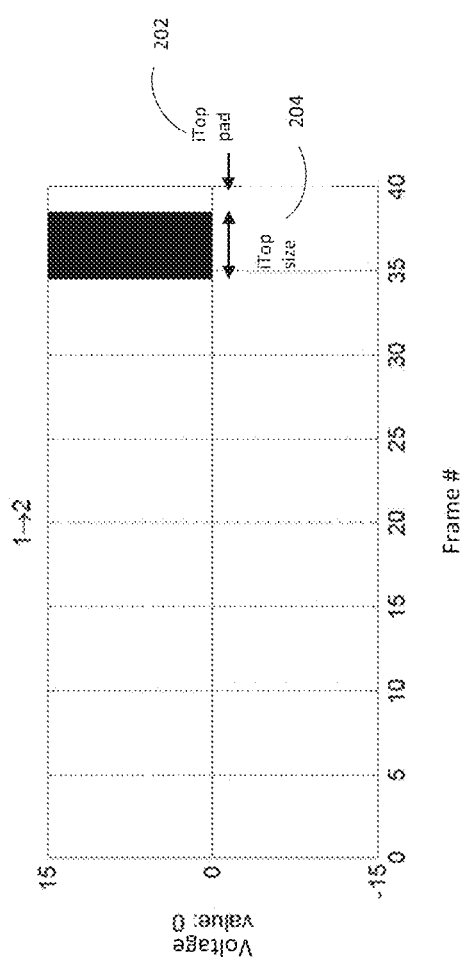
FIG. 3 is a graphical schematic of an inverted top-off pulse, according to some embodiments.

FIG. 3 illustrates a graphical schematic of an inverted top-off pulse, where such waveform may be applied to "edge clear" a display pixel, as illustrated above in FIG. 2B. The iTop Pulse may be defined by two tunable parameters—the size (impulse) of the pulse ("iTop size"—i.e., the integral of the applied voltage with respect to time) and the "padding" i.e., the period between the end of the iTop Pulse and end of the waveform ("iTop pad"). These parameters are tunable and may be determined by the type of display and its use, the preferred ranges in number of frames are: size between 1 and 35, and pad between 0 and 50. As stated above these ranges may be larger if display performance so requires.

In some embodiments, the iTop Pulse used in dark mode displaying may be applied inversely (opposite polarity) to reduce ghosting, edge artifacts and flashiness when displaying in light mode as a "top-off pulse". As described in aforementioned U.S. Patent Publication No. 2013/0194250, which is incorporated herein in its entirety, a "top-off pulse" applied to a white or near-white pixel drives the pixel to the extreme optical white state (and is the opposite polarity of the iTop Pulse, which drives the pixel to the extreme optical black state). Typically, the top-off pulse is not used due to its DC imbalanced waveform. However, when used in conjunction with the remnant voltage discharging, the effects of the DC imbalanced waveform may be reduced or eliminated and the display performance may be enhanced. Thus, the top-off pulse is less limited in terms of size and application. In some embodiments, the top-off size may be up to 10 frames and may be even greater. Further, as described, the top-off pulse may be applied in place of the balanced pulse pair ("BPP"), which is a pair of drive pulses of opposing polarities such that the net impulse of the balanced pulse pair is substantially zero.

Figure 4:
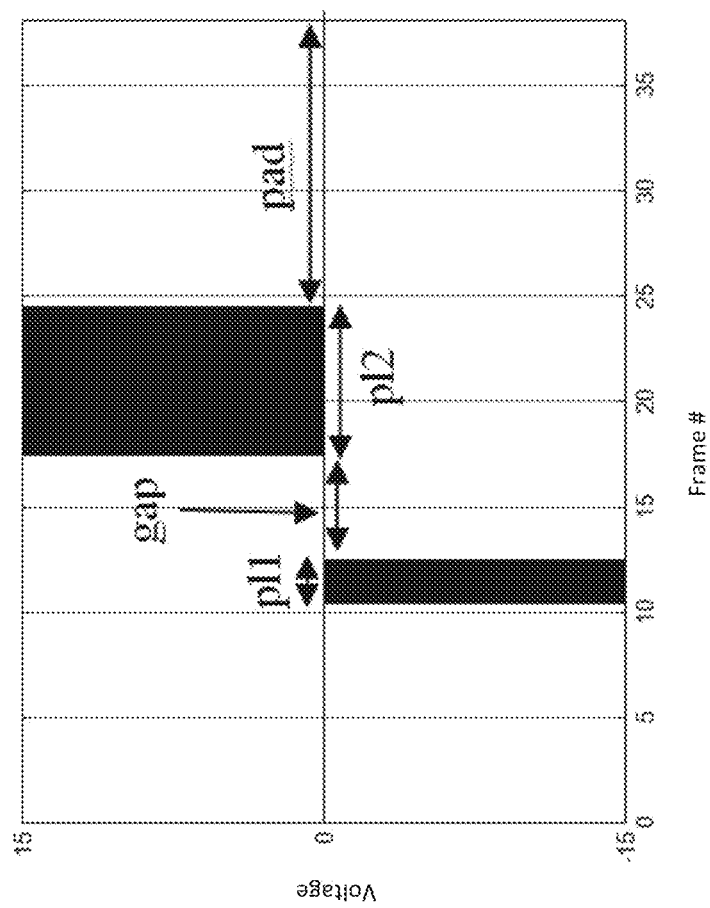
FIG. 4 is a graphical schematic of an iFull Pulse by voltage and frame number, according to some embodiments.

FIG. 4 is a graphical schematic of an iFull Pulse where voltage is on the y-axis and frame number is on the x-axis. Each frame number denotes the time interval of 1 over the frame rate of the active matrix module. The iFull Pulse may be defined by four tunable parameters: 1) the size (impulse) of the iFull Pulse that drives to white ("pl1" parameter); 2) the "gap" parameter, i.e., the period between the end of the "pl1" and the "pl2" parameter; 3) the size of the iFull Pulse that drives to black ("pl2") and the "padding" parameter—i.e., the period between the end of the pl2 and end of the waveform ("pad"). The pl1 represents the initial drive to white state. The pl2 represents the drive to black state. The iFull Pulse improves lightness error by erasing the edge artifacts that may be created by adjacent pixels not driving from black to black. However, the iFull Pulse may introduce significant DC imbalance. The iFull Pulse parameters are tunable to optimize the performance of the display by reducing edge artifact accumulation with minimum DC imbalance. Although all parameters are tunable and may be determined by the type of display and its use, the preferred ranges in number of frames are: impulse size between 1 and 25, gap between 0 and 25, size between 1 and 35, and pad between 0 and 50. As stated above these ranges may be larger if display performance so requires.

FIG. 5A illustrates a plurality of pixels going through a series of update cycles (e.g., 8 cycles) to update the entire set of pixels, where each update cycle updates only a portion of the pixels, as described above. FIG. 5B illustrates an exemplary pixel map matrix where each display pixel is programmed to be updated in a particular update cycle. FIG. 5C illustrates an exemplary algorithm where the pixel map of FIG. 5B may be generated.

FIG. 6A illustrates an exemplary flow process where a plurality of pixels may be firstly mapped out and subsequently updated in a particular update cycle. Where in step 610 a desired dithering mask may be chosen, the size of the dithering mask may depend on design goals regarding overall display flashness, pixel fatigue and update time. In step 612, each display pixel is assigned a numerical value, such that display pixels will be grouped according their assigned number and will be updated one group (e.g., 8 groups as described above) at a time. Finally in step 614, when the pixels are going through the update phase, appropriate waveforms will be applied to the pixels. For example, as discussed above, the group of pixels that are chosen to go through the update will be applied an iFull pulse, while its cardinal neighbors will be applied an iTop pulse to get rid of the edge artifacts. FIG. 6B illustrates one embodiment of an algorithm where the process illustrated in FIG. 6A may be implemented.

Alternatively, in some other embodiments, pixels chosen for a full update or reset (e.g., pixels 702 and 704) may be instead applied a top-off pulse (e.g., iTop pulse) instead of a full clearing pulse (e.g., iFull pulse), and its cardinal pixels may stay idle or be applied a null waveform. This setup allows for an even less flashy update of the dark background pixels in a dark mode operation. Due to the nature of the ink particles, applying only a top-off pulse such as the iTop pulse instead of a full clearing pulse can produce an even less flashy update of the display pixels, while still maintain a relatively consistent graytone throughout the display (e.g., between the updated pixels 702, 704 and the its idle cardinal pixels).

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A method for driving an electro-optic display having a plurality of pixels, the method comprising:
dividing the plurality of pixels into n groups, the plurality of pixels configured to display white text on a black background, and wherein n is an integer larger than 1;
applying a full clearing waveform to at least one group of the n groups of pixels; and
subsequently, apply a top off waveform to cardinal pixels of the at least one group of pixels.

2. The method of claim 1 wherein the applying a full clearing waveform step further comprises applying the full clearing waveform to all groups of pixels in a pre-determined sequence.

3. The method of claim 1, wherein the electro-optic display is an electrophoretic display having a layer of display medium.

4. The method of claim 3 wherein the layer of display medium is an electrophoretic medium.

5. The method of claim 4 wherein the layer of display medium is an encapsulated electrophoretic display medium.

6. The method of claim 4 wherein the electrophoretic medium comprises a liquid and at least one particle disposed within said liquid and capable of moving therethrough on application of an electric field to the medium.

7. A method for driving an electro-optic display having a plurality of pixels, the method comprising:
   dividing the plurality of pixels into n groups, the plurality of pixels configured to display white text on a black background, and wherein n is an integer larger than 1; and
   applying a top off waveform to at least one group of the n groups of pixels.

8. The method of claim 7 wherein the applying a full clearing waveform step further comprises applying the full clearing waveform to all groups of pixels in a pre-determined sequence.

9. The method of claim 7, wherein the electro-optic display is an electrophoretic display having a layer of display medium.

10. The method of claim 9 wherein the layer of display medium is an electrophoretic medium.

11. The method of claim 9 wherein the layer of display medium is an encapsulated electrophoretic display medium.

12. The method of claim 9 wherein the display medium comprises an electrophoretic medium comprising a liquid and at least one particle disposed within said liquid and capable of moving therethrough on application of an electric field to the medium.

13. A method for driving an electro-optic display having a plurality of pixels, the method comprising:
   applying a DC-imbalanced full clearing waveform to a non-zero minor proportion of the plurality of pixels, the plurality of pixels configured to display white text on a black background; and
   applying a DC-imbalanced top off waveform to cardinal pixels of the non-zero minor proportion of the plurality of pixels.

14. The method of claim 13 further comprises applying the DC-imbalanced full clearing waveform to a different non-zero minor proportion of the plurality of pixels.

15. The method of claim 14 further comprises applying the DC-imbalanced top off waveform to cardinal pixels of the different non-zero minor proportion of the plurality of pixels.

16. A method for driving an electro-optic display having a plurality of pixels, the method comprising:
   applying a DC-imbalanced top-off waveform to a non-zero minor proportion of the plurality of pixels, the plurality of pixels configured to display white text on a black background; and
   applying the DC-imbalanced top-off waveform to a different non-zero minor proportion of the plurality of pixels.

* * * * *